United States Patent [19]

Grave

[11] Patent Number: 5,253,343
[45] Date of Patent: Oct. 12, 1993

[54] METHOD FOR THE MANAGEMENT OF A MEMORY OF MESSAGES IN A STATION OF A DATA TRANSMISSION NETWORK, AND STATION DESIGNED FOR THE IMPLEMENTATION OF THE METHOD

[75] Inventor: Jean-Marie Grave, Mareil Marly, France

[73] Assignee: La Telemecanique Electric, France

[21] Appl. No.: 914,020

[22] Filed: Jul. 15, 1992

Related U.S. Application Data

[63] Continuation of Ser. No. 395,612, Aug. 18, 1989.

[30] Foreign Application Priority Data

Aug. 18, 1988 [FR] France ................ 88 10992

[51] Int. Cl.[5] .............. G06F 13/14; G06F 13/362
[52] U.S. Cl. .................. 395/200; 364/238.8; 364/239.5; 364/242.6; 364/242.94; 364/284.1; 364/DIG. 1
[58] Field of Search ... 364/200 MS File, 900 MS File; 395/200, 250, 325, 725

[56] References Cited

U.S. PATENT DOCUMENTS

| | | | |
|---|---|---|---|
| 3,638,198 | 1/1972 | Balogh, Jr. ............... | 395/800 |
| 4,215,399 | 7/1980 | Pavicic et al. ............ | 395/200 |
| 4,281,381 | 7/1981 | Ahuja et al. ............. | 395/325 |
| 4,412,285 | 10/1983 | Neches et al. ........... | 364/200 |
| 4,442,504 | 4/1984 | Dummermuth et al. ..... | 364/900 |
| 4,480,314 | 10/1984 | McKelley, Jr. et al. .... | 364/900 |
| 4,494,192 | 1/1985 | Lew et al. ............... | 364/200 |
| 4,809,217 | 2/1989 | Floro et al. ............. | 364/900 |
| 4,814,979 | 3/1989 | Neches .................. | 364/200 |
| 4,835,674 | 5/1989 | Collins et al. ........... | 364/200 |
| 4,967,344 | 10/1990 | Scavezze et al. ......... | 364/200 |
| 4,975,834 | 12/1990 | Xu et al. ................ | 395/800 |
| 4,979,100 | 12/1990 | Makris et al. ........... | 364/200 |

Primary Examiner—Gareth D. Shaw
Assistant Examiner—Dennis M. Butler
Attorney, Agent, or Firm—William A. Drucker

[57] ABSTRACT

A method for the management of a memory of message or similar information in a station of a data transmission network, having a bus arbitrator governing the access, to the bus, by the different stations, wherein the emission of messages by a station implies the sending, to the arbitrator, of a corresponding request and the storage, by this arbitrator, with the order being preserved, of all the requests received by the station, then subsequently the sending, by the arbitrator, towards the station considered, of permission to emit. The method comprises steps of the storage, successively in the memory, of the pieces of information to be emitted, with their order being preserved, the modification, when a request is accepted by the arbitrator, of the value of an index of access to said memory and the emission, whenever permission to emit is received by the arbitrator, of the information designated by an indicator indexed by said index. Also disclosed is a station to implement the method.

6 Claims, 2 Drawing Sheets

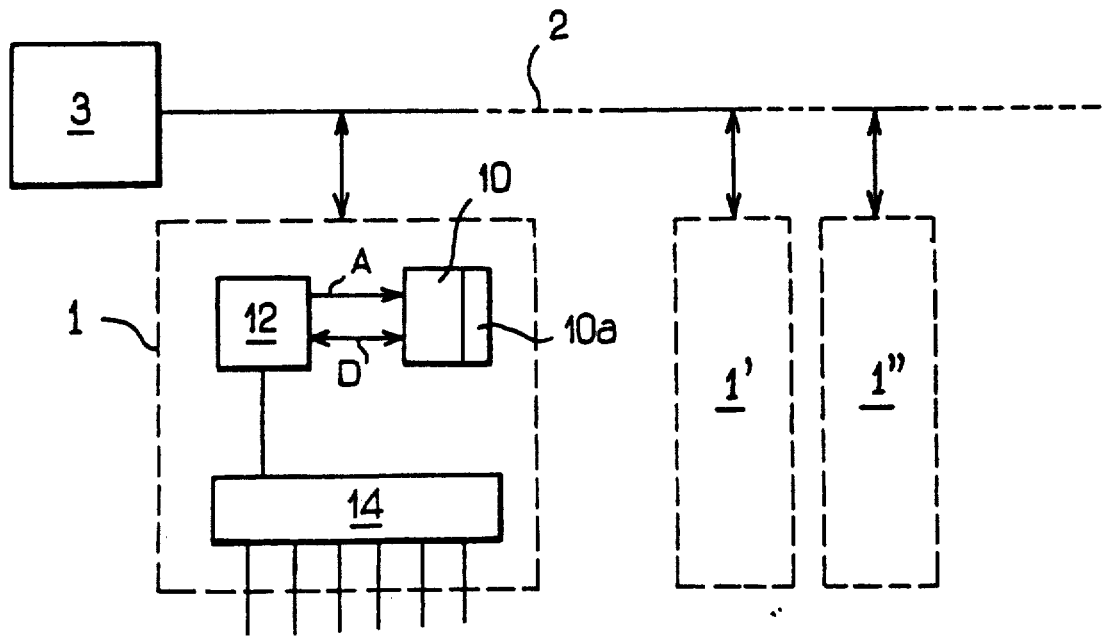
FIG_1
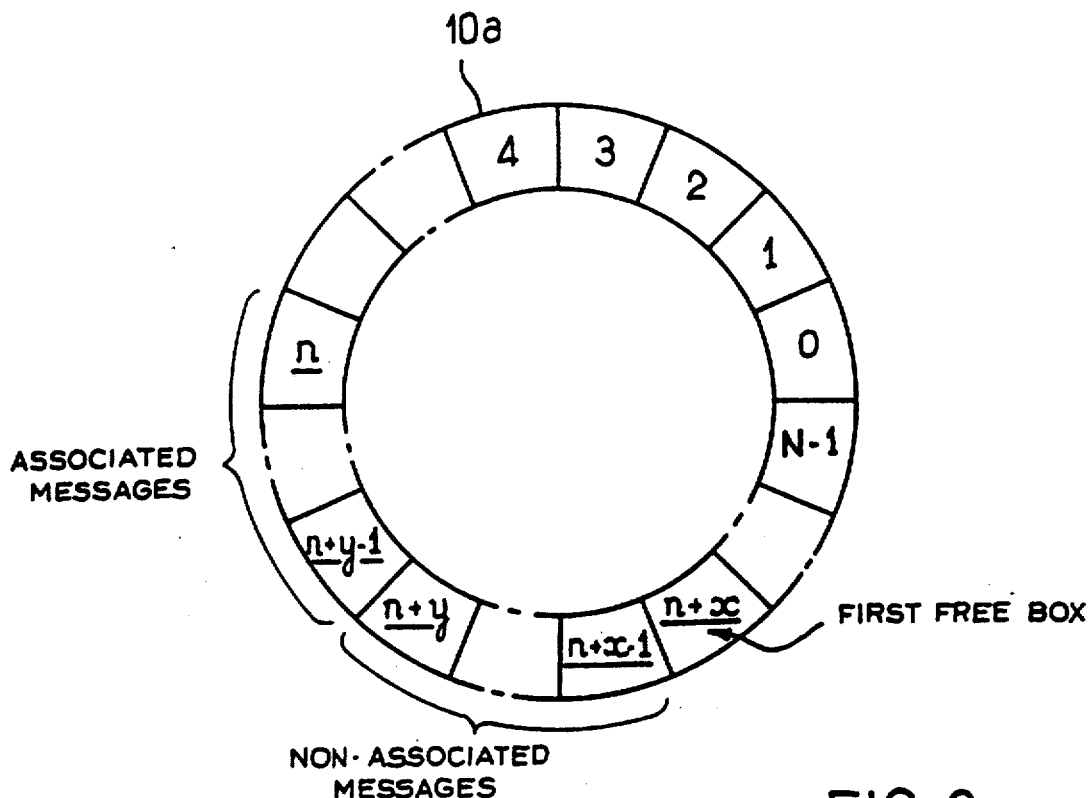
FIG_2

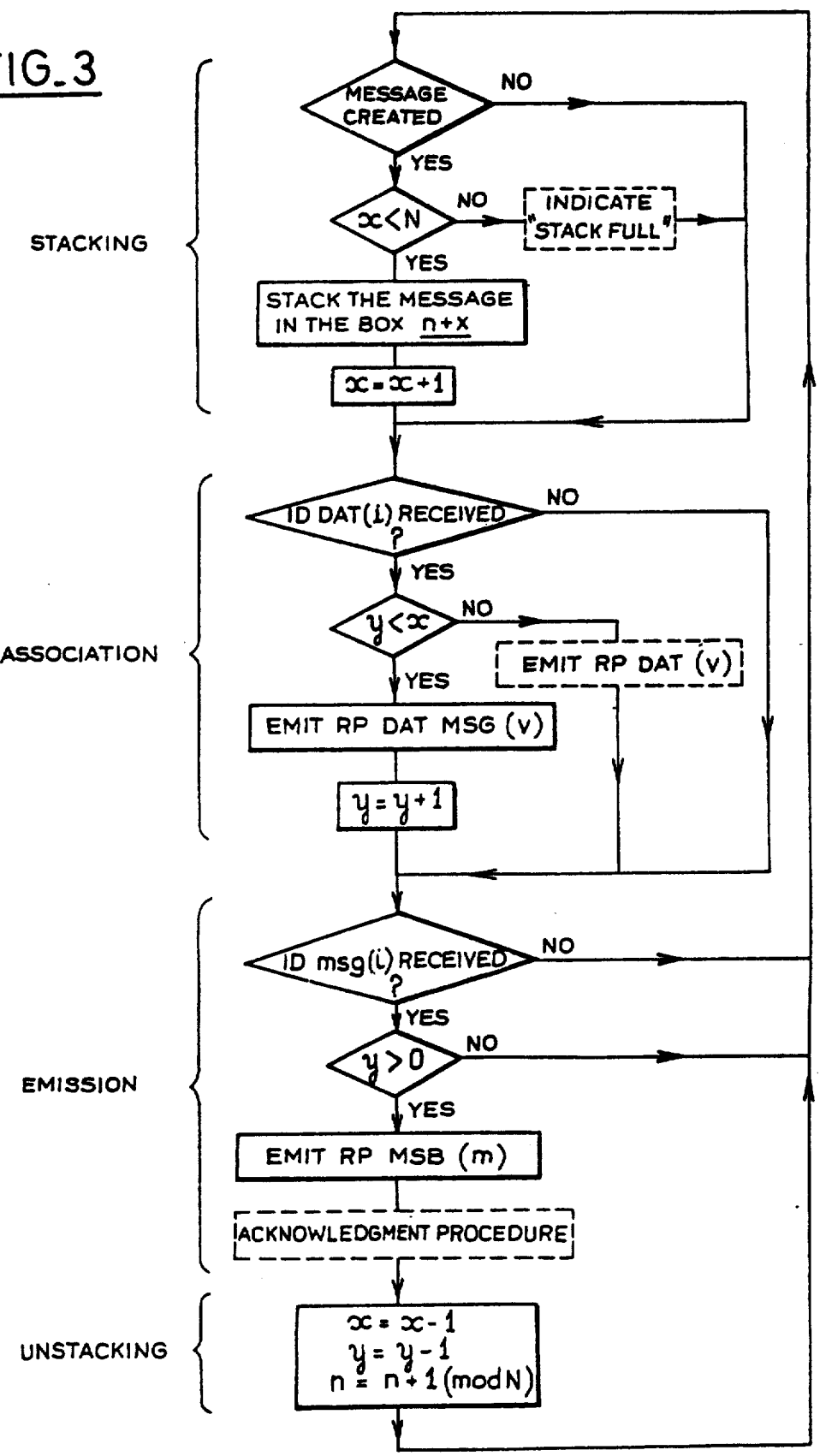

METHOD FOR THE MANAGEMENT OF A MEMORY OF MESSAGES IN A STATION OF A DATA TRANSMISSION NETWORK, AND STATION DESIGNED FOR THE IMPLEMENTATION OF THE METHOD

This application is a continuation of application Ser. No. 07/395,612, filed Aug. 18, 1989.

BACKGROUND OF THE INVENTION

1. Field of the Invention

The present invention pertains to a method and to a device for the management of a buffer memory, and more particularly, of a First In First Out type memory for the storage of data to be emitted on a distribution type of communications network.

2. Description of the Prior Art

A communications network of this type, used notably in industry (the so-called local area type of network) conventionally has a bus type transmission line, a set of stations having to emit and receive data, such as values of parameters and, possibly, messages, on the network, and an arbitrator entrusted with managing the access by the different stations to the network.

Typically, the pieces of data exchanged on the network are values of industrial parameters, called "objects", determined once and for all and properly identified. However, certain types of networks offer a nonpriority mode of "message storing and forwarding" service that permits the transmission of messages among the different stations under certain conditions. When this is the case, each station, creating messages intended for the other stations, should store these messages in a buffer memory, pending its being given permission by the arbitrator, which determines time periods reserved for this type of transmission, to emit a first message and then the following messages one after the other.

SUMMARY OF THE INVENTION

The present invention proposes to optimize the management of a memory such as this, in minimizing the movement of data in this memory and in reducing, to the minimum, the storage of pieces of information other than the messages proper.

To this effect, the present invention concerns, first of all, a method for the management of a memory of information in a station of a data transmission network comprising a plurality of stations, connected to one another by a bus, as well as a bus arbitrator governing the access to the bus by the different stations, a network of the type wherein the emission, by a station, of at least one type of information, implies the sending, to the arbitrator, of a corresponding request and the storage, by this arbitrator, with the order being preserved, of all the requests received by the station, then subsequently the sending, by the arbitrator, towards the station considered, of permission to emit this type of information, said method comprising steps consisting in:

the storage, successively in the memory, of the pieces of information to be emitted, with their order being preserved;

the modification, when a request is accepted by the arbitrator, of the value of an index of access to said memory; and the emission, whenever permission to emit is received by the arbitrator, of the information designated by an indicator indexed by said index.

The invention also concerns a station of a data transmission network for the implementation of the above-defined method, of the type having a central processing unit, a random access memory and a data acquisition and/or restoration unit wherein at least one part of the memory is a message memory to which access by the central processing unit is governed by a indicator of the position of the first message, an index of the number of memorized messages, and an index of the number of memorized messages for which a message emission request has been sent on the network, the indicator being incremented or decremented modulo N, N being the number of locations for messages in said part of the memory.

BRIEF DESCRIPTION OF THE DRAWINGS

Other aspects, aims and advantages of the invention will appear more clearly from the following detailed description of a preferred embodiment of this invention, given by way of example and made with reference to the appended drawings, of which:

FIG. 1 is a block diagram of a so-called local area network to which the present invention can be applied;

FIG. 2 is a diagram of the organization of a memory of a station of the local area network of FIG. 1, managed in accordance with the present invention, and FIG. 3 is a program flowchart of the working of the management unit for this memory.

DESCRIPTION OF A PREFERRED EMBODIMENT

Referring first of all to FIG. 1, a local area network for communication in an industrial environment has a set of stations 1, 1', 1", ... such as microprocessor-controlled automatons, connected to one another through a distribution type of network 2 formed, in practice, by a simple bus. A bus arbitrator 3 is entrusted with managing the different operations of access to the bus for exchanging data, messages, etc. among the different stations. We shall not give a detailed description herein of the entire architecture of a network of this type. For more information, reference may be made to the "FIP" document.

In the context of a network of this type, the invention very particularly concerns the exchange of "message" type data. This function is integrated alongside the normal and cyclical working of a network of this type for the exchange of values of objects among the stations.

It should be specified, first of all, that the first role of the bus arbitrator 3 is to enable the cyclical and automatic exchange of data or values of objects on the bus 2, by the successive dispatch to this bus 2 of a plurality of identifiers associated beforehand and biuniquely with each of the objects, in the form of frames marked ID DAT (i), i being the identifier. Each identifier, received simultaneously by the totality of the connected stations, gives one of them the initiative to emit, on the bus, a frame containing the value v of the object considered, marked RP DAT (v), and gives one or more of the other stations the initiative to tune in to the bus, to receive the frame in question and thus complete the exchange of the object value considered.

When a station, after having created and memorized a message designed to be sent to one or more other stations, wishes to emit this message, it emits a corresponding request towards the bus arbitrator 3. Given, however, that a station never has the initiative of exchanges of information on the bus, irrespectively of the values of objects or of the messages, a request such as this is transmitted here to the arbitrator when a frame RP DAT (v), containing an object value, is sent out on the bus by the station in question, this frame being complemented with a specific field marked MSG, dedicated to this function. One of the roles of the arbitrator is to identify the various requests of this type, received by the various stations, store these requests in a stack (memory) of the First In First Out type and, at each temporal window reserved for the transmission of "message" type information, to send out a message identifier frame, marked ID MSG (i) on the bus. This message identifier frame ID MSG (i) permits the emitting station considered, subsequent to its request, to send out the message m on the bus, in the form of a frame RP MSG (m), sent to the stations concerned by the message, according to the First In First Out base concerned.

As can be seen, each station has, chiefly, a central processing unit 12, for example a microprocessor-based central processing unit, a random access memory 10 connected to the central processing unit by an address bus A and a data bus D, as well as a interface unit 14 for interfacing with an industrial process, notably with appropriate sensors and actuators. The set is driven in a standard way by a program contained in a read-only memory (not illustrated). An object of the present invention is, in association with a network organization of this type, a memory management method and device that avoid a redundancy with the management of the identifiers of messages by the bus arbitrator and simplify the processing of the messages to be emitted in each station of the network with, in particular, a movement, reduced to the minimum, of the messages in the memory, and a memory size also reduced to the minimum.

Referring now to FIG. 2, a part 10a of the random-access memory 10 of the station of the network has been shown. This part is designed for the temporary storage of messages to be emitted to other stations, and comprises a set of N locations or "boxes" for these messages. The memory forms a stack of the First In First Out (FIFO) type, i.e. it is the message that has been created and stored first in the memory that will be emitted first in the network, following permission ID MSG (i) sent by the arbitrator, as shall be seen in detail further below.

As has been illustrated, the memory is managed in loop mode, i.e. the indicators, whether indexed or not, that select its various locations, are counted modulo N.

Referring simultaneously to FIGS. 2 and 3, we shall now give a detailed description of the different steps of the management of messages in the station 1 as well as the corresponding steps of the management of the memory 10a storing these messages.

The following conventions will be adopted:

N is the total number of boxes for messages in the memory;

n is an indicator designating the number of the first box occupied in the memory, with $0 \leq n < N$;

x is an index designating the total number of boxes occupied by messages, with $0 < = x < =$ y is an index designating the number of messages contained in the memory and associated with identifiers, with $0 < = y < = x$.

The indicator n and any indexed indicator making it come into play are counted modulo N.

When the station has created a message designed to be emitted, on the network, to one or more other determined stations, the processor ascertains, first of all, that memory 10a is not full, i.e. that there is really $x < N$. If this is the case, the message is stacked in the memory. If not, the stacking is rejected, and a corresponding warning may be addressed to the user.

It may be noted here that the message, simply stacked as described above, is not associated, i.e. an identifier i associated with this specific message does not ye exist in the network.

Besides, once there is at least one message, recently created or not, that exists in the memory 10a and has not yet undergone an operation of association as shall be described in detail here below, i.e. once we have $y < x$, then an association such as this is achieved in the following way: as soon as it has received an object value identifier, marked ID DAT (i), the station, as indicated above, sends back a response frame of the RP DAT MSG (v) type which not only returns the value (v) of the object associated with this identifier but will also indicate to the bus arbitrator that a message in the stack is awaiting an association with a view to its subsequent emission. Once this response frame has been emitted and taken into account by the arbitrator, there is an additional identifier i in the network, available for the emission of messages from the station.

Then, in the next step, the process of association is completed by transcribing this new situation within the station. This is done by incrementing the index y by one unit, that is, $y = y + 1$. In other words, the number of messages that are contained in the memory and are already associated is incremented by one unit.

Should all the messages be already associated, i.e. should $y = x$, then a simple frame RP DAT (v) is re-emitted.

Thus, it is already noted that the stack of the identifiers of messages located in the arbitrator and the stack of messages located in the station considered, work together remotely in order to manage the emission of the messages. More precisely, the index y constitutes a sufficient trace of the association of the messages one after the other, i.e. of the stacking of the corresponding message identifiers in the stack of the arbitrator, thus making it possible, advantageously, to create a concrete association of each message with its identifier in the special common memory.

Now, when, in a temporal window reserved for the emission of messages, the arbitrator sends out the message identifier ID MSG (i), which is in first position in its stack, on the bus, the station then detects this identifier, which constitutes permission to emit a message. It then ascertains that there actually is at least one associated message in the stack 10a, i.e. that the condition $y > 0$ is fulfilled, and it then emits, on the bus, that message, among all the associated messages, which is placed in the first position, i.e. the message that occupies the box n, in the form of a general type frame RP MSG (m). If not, no message is emitted.

After the emission, there are two possibilities, depending on whether the message transfer is of the acknowledgment type (frame RP MSG ACK (m)) or not (frame RP MAG NOACK (m)). In the former case, the station goes into a state of waiting for the corresponding acknowledgment (frame RP ACK) coming from the station to which the message was sent, according to a standard process which shall not be described in detail herein.

Once the corresponding acknowledgment or acknowledgments have been received, then the station can get rid of the emitted messages, i.e. unstack the message from the pile. This operation makes it necessary, first of all, to check the fact that there is at least one associated message, i.e. y>0 (as for the emission) in the memory 10a. If this is the case, the central processing unit simply performs the following operations on the index and addressing indicators:

$x = x - 1$ $y = y - 1$, and $n = n + 1 \pmod{N}$

It will be understood that this amounts to releasing the first location of the memory (formerly box n), and in reducing the total number of messages x and the total number of messages y by one unit. It is therefore the box that was formerly n+1 that becomes the first box containing a message, and it is this message that will be sent out on the bus during the next temporal window reserved for the emission of messages.

Should the message be transmitted without acknowledgment, the unstacking of the emitted message, as described above, is done without any other condition immediately after the emission of the message on the bus.

FIG. 3 uses a program flowchart to illustrate the various main steps of the memory management method as described above. It should be considered as forming part of the present description. It has to be noted that this program flowchart forms only a sub-program of the working of the station, and that, with a view to clarity, the full range of interactions with the main program is not illustrated. Furthermore, in FIG. 3, operations that are optional or minor ones from the viewpoint of the present invention have been shown in dashes.

The table I below summarizes the main aspects of the memory management method according to the invention.

TABLE I

| Action | Condition | Satisfied? | Execution |
|---|---|---|---|
| Stacking | x < N | No | Stacking rejected |
| | | Yes | Stack the message in the box $n + x$ (mod N) then do $x = x + 1$ |
| Association | y < x | No | Association rejected |
| | | Yes | Associate the message occupying the box $n + y$ (mod N) then do $y = y + 1$ |
| Emission | y > 0 | No | Emission rejected |
| | | Yes | Emit the message occupying the box |
| Unstacking | y > 0 | No | Unstacking rejected |
| | | Yes | Do $x = x - 1$ $y = y - 1$ $n = n + 1 \pmod{N}$ |

It is quite clear that each station of a data transmission network of the type considered will include functionalities such as those described above.

The present invention can be advantageously applied to any type of distribution network that offers a message storage and forwarding service and wherein the initiative of access to the network, whether for the transmission of data or of messages, is reserved to the arbitrator alone, the main condition being that the arbitrator, for its part, preserves, in a memory, a "First In First Out"

(FIFO) type of stack of the different identifiers of messages received from the stations and, consequently, in this way, preserves the order in which the requests for emission of messages have been received from the respective stations of the network, restoring the corresponding permission in the same order.

Besides, through the use of a memory managed in loop mode, the movements of message type pieces of information in the memory are reduced to the minimum. Also avoided is the use of a memory organization comprising N boxes for messages associated with N boxes for corresponding identifiers. The capacity of the memory is thus also reduced to the minimum.

Clearly, the present invention is in no way restricted to the embodiment described above and represented in the drawings, but those skilled in the art will be capable of making any variant thereof or modification thereto in accordance with its spirit.

What is claimed is:

1. In a data transmission network comprising a plurality of stations, a bus connecting the stations to each other and a separate bus arbitrator governing access to the bus by each station, the network being of a type wherein the transmission of at least one type of elementary information from one station to another through the bus requires that said one station first transmits to the arbitrator, through the bus, a corresponding request, the arbitrator storing in an arbitrator memory all the requests successively received in the order of their reception, the arbitrator subsequently transmitting through the bus, to said one station, a permission to transmit information for which a request has been stored by said arbitrator, and each station comprising a station memory including a plurality of locations for storing a plurality of said elementary information of said at least one type until they are transmitted, a method for the management of each station memory comprising in each station the following steps:

(a) storing in successive ones of said plurality of locations in said station memory successive ones of said elementary information to be transmitted, with their order being preserved, and each time one elementary information is stored in one location of said station memory, modifying by one unit a first index x indicative of the location of said elementary information in said station memory;

(b) each time one request has been transmitted to the arbitrator by said station, modifying by one unit a second index y indicating that one more elementary information stored in one location of said station memory has a request associated therewith;

(c) each time said station receives from the arbitrator a permission to transmit, transmitting one elementary information having a request associated therewith and then modifying said first and second indexes by one unit in a direction opposite to the direction of index modification in steps (a) and (b);

(d) the preservation of the order of the requests in said arbitrator memory and of the elementary information in said station memory locations, together with the modification of the indexes being sufficient to establish a correspondence between each request and each elementary information to be transmitted.

2. A method according to claim 1 wherein the elementary information is stored in said station memory on a First In First Out basis and wherein said first index is modified in step (a) by incrementation.

3. A method according to claim 2 wherein said first index represents the number of elementary information stored in said station memory and is incremented for each storage of one elementary information.

4. A method according to claim 3, wherein when an elementary information has been validly transmitted on the network, incrementing an indicator representing the position of a first elementary information in said station member modulo N, N being the number of locations for storing elementary information in said station memory, and decrementing said first and second indexes to erase said validity transmitted elementary information from said station memory.

5. A method according to claim 1 wherein the network is a local area network for cyclical and automatic transmission of parameter values amongst a set of industrial automatons, said elementary information are messages and said requests for transmission of messages are included in frames used for transmission of said parameter values.

6. A station for a data transmission network comprising a plurality of such stations, a bus connecting the stations to each other and a separate bus arbitrator governing access to the bus by each station, the network being of a type wherein a transmission of one message from one station to another through the bus requires that said one station first transmits to the arbitrator, through the bus, a corresponding request, all the requests successively received by the arbitrator being stored in an arbitrator memory in the order of their reception, wherein the arbitrator subsequently transmits through the bus, to said one station, a permission to transmit a message for which a request has been stored by said arbitrator, and wherein each station comprises a station memory including a plurality of locations for storing a plurality of messages until their are transmitted, each station comprising:

(a) a central processing unit;

(b) a random access memory connected to said central processing unit and a part of which constitutes a message memory for said messages;

(c) a data acquisition and/or restoration un it connected to said central processing unit;

(d) means for storing in successive ones of said location in said message memory said messages to be transmitted with their order being preserved, access to the locations of the message memory for such storage being governed by an indicator of the position of a first stored message and by a first index of the number of stored messages;

(e) means for incrementing said first index by one unit each time one message is stored in said message memory;

(f) means for transmitting requests to the arbitrator and for incrementing by one unit a second index of the number of stored message for which a request has been sent each time one said request is sent; and (g) means for transmitting one message each time a permission to transmit is received from the arbitrator, and for decrementing said first and second indexes by one unit once said one message has been transmitted, (h) the preservation of the order of the requests in aid arbitrator memory and of the messages in said message memory locations, together with the incrementations/decrementations of said first and second indexes, being sufficient to establish a correspondence between each request and each message to be transmitted.

* * * * *